United States Patent
Grutter et al.

(10) Patent No.: US 8,740,744 B2
(45) Date of Patent: Jun. 3, 2014

(54) ADJUSTING MOTOR TORQUE TO COMPENSATE FOR UPHILL AND DOWNHILL DEMANDS DURING CRUISE CONTROL IN HYBRID VEHICLE

(75) Inventors: Peter John Grutter, Plymouth, MI (US); Roger Lyle Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 13/465,194

(22) Filed: May 7, 2012

(65) Prior Publication Data

US 2013/0296105 A1    Nov. 7, 2013

(51) Int. Cl.
*B60W 10/02* (2006.01)
*B60W 10/08* (2006.01)

(52) U.S. Cl.
USPC .............................. 477/5; 477/901; 903/947

(58) Field of Classification Search
USPC ........... 477/2, 4, 5, 8, 9, 12, 14, 27, 115, 118, 477/166, 188, 901; 903/906, 912, 947; 180/65.245
See application file for complete search history.

(56) References Cited

U.S. PATENT DOCUMENTS

| | | | |
|---|---|---|---|
| 7,715,971 B2 * | 5/2010 | Okuda et al. ................... 701/93 |
| 7,828,693 B2 | 11/2010 | Soliman et al. | |
| 8,414,450 B2 * | 4/2013 | Ueno et al. ......................... 477/5 |
| 8,433,494 B2 * | 4/2013 | Vogel ............................... 701/93 |
| 2004/0231330 A1 * | 11/2004 | Ibaraki et al. .................... 60/670 |
| 2011/0174559 A1 * | 7/2011 | Saito et al. .................. 180/65.27 |

FOREIGN PATENT DOCUMENTS

| | | | |
|---|---|---|---|
| DE | 102010028486 A1 | 11/2011 |
| GB | 2454891 A | 5/2009 |
| WO | 2011063823 A1 | 6/2011 |
| WO | 2011076226 A1 | 6/2011 |

\* cited by examiner

*Primary Examiner* — Justin Holmes
(74) *Attorney, Agent, or Firm* — David B. Kelley; Brooks Kushman P.C.

(57) ABSTRACT

A system and method for controlling a hybrid vehicle having an engine, a battery powered traction motor, and an automatic step-ratio transmission selectively coupled in series by a clutch include engaging the clutch to couple the engine and the motor and controlling motor torque to provide braking torque through the transmission to substantially maintain a cruise control speed. In one embodiment, a hybrid electric vehicle includes a battery powered traction motor connected to a transmission, an engine selectively coupled in series with the motor by a clutch, and a controller communicating with the traction motor and the engine and configured to control the motor to provide braking torque when the clutch is engaged and engine braking torque is insufficient to maintain cruise control speed of the vehicle as the vehicle travels downhill.

17 Claims, 2 Drawing Sheets

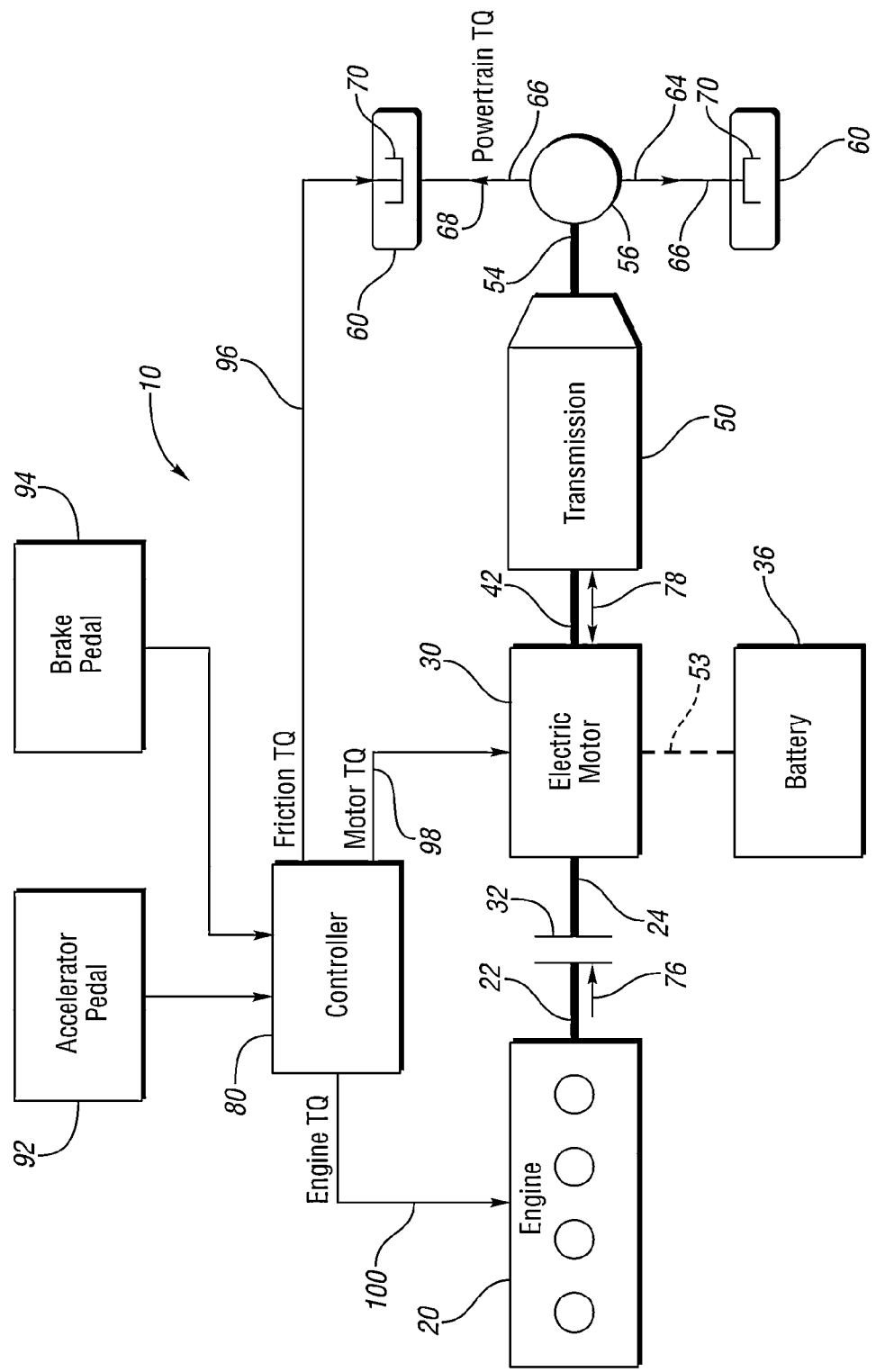

US 8,740,744 B2

ADJUSTING MOTOR TORQUE TO COMPENSATE FOR UPHILL AND DOWNHILL DEMANDS DURING CRUISE CONTROL IN HYBRID VEHICLE

TECHNICAL FIELD

The present invention relates to cruise control in a hybrid vehicle powertrain.

BACKGROUND

A hybrid electric vehicle powertrain includes an engine and an electric motor, wherein torque (or power) produced by the engine and/or by the motor can be transferred through a transmission to the vehicle drive wheels to propel the vehicle. A traction battery supplies energy to the motor for the motor to produce the (positive) motor torque for propelling the vehicle. The motor may provide negative motor torque to the transmission (for example, during regenerative braking of the vehicle) and thereby act as a generator to the battery. The engine may also provide negative engine torque to the transmission to provide engine braking for braking the vehicle.

In a modular hybrid transmission ("MHT") configuration, the engine is connectable to the motor by a disconnect clutch and the motor is connected to the transmission. The engine, the disconnect clutch, the motor, and the transmission are connected sequentially in series.

SUMMARY

Embodiments of the present invention are directed to a controller and a control strategy for a hybrid electric vehicle having an engine, an electric motor, and a transmission in which the motor is connected to the transmission and the engine is connectable to the transmission via the motor and a disconnect clutch. The controller and the control strategy control motor torque to maintain cruise control speed of the vehicle.

Various embodiments include a system and method for controlling a hybrid vehicle having an engine, a battery powered traction motor, and an automatic step-ratio transmission selectively coupled in series by a clutch include engaging the clutch to couple the engine and the motor and controlling motor torque to provide braking torque through the transmission to substantially maintain a cruise control speed. In one embodiment, a hybrid electric vehicle includes a battery powered traction motor connected to a transmission, an engine selectively coupled in series with the motor by a clutch, and a controller communicating with the traction motor and the engine and configured to control the motor to provide braking torque when the clutch is engaged and engine braking torque is insufficient to maintain cruise control speed of the vehicle as the vehicle travels downhill. The motor torque may be controlled such that the transmission maintains a gear ratio with the cruise control speed being maintained as the vehicle travels over a hill. The motor braking torque is a negative motor torque to maintain the cruise control speed of the vehicle as the vehicle travels downhill. The motor torque is a positive motor torque to maintain the cruise control speed of the vehicle as the vehicle travels uphill.

The method may further include transferring engine braking torque to the transmission from the engine via the motor to attempt to maintain the cruise control speed of the vehicle as the vehicle travels downhill. In this case, transferring motor torque to the transmission includes transferring motor braking torque from the motor to the transmission which together with the engine braking torque maintains the cruise control speed whereby shifting of the engine to a lower gear to maintain the cruise control speed is avoided. The motor braking torque may include two components: an initial motor braking torque component which is transferred to the transmission in conjunction with the engine braking torque to maintain the cruise control speed when the engine can provide enough engine braking torque to maintain the cruise control speed without having to shift to a lower gear; and an additional motor braking torque component which is transferred in conjunction with the engine braking torque to maintain the cruise control speed when the engine alone would have to shift to a lower gear to provide additional engine braking torque.

The method may further include transferring engine propelling torque to the transmission from the engine via the motor to attempt to maintain the cruise control speed of the vehicle as the vehicle travels uphill. In this case, transferring motor torque to the transmission includes transferring motor propelling torque from the motor to the transmission which together with the engine propelling torque maintains the cruise control speed whereby a downshifting engagement to maintain the cruise control speed is avoided. The motor propelling torque may include two components: an initial motor propelling torque component which is transferred to the transmission in conjunction with the engine propelling torque to maintain the cruise control speed when the engine can provide enough engine propelling torque to maintain the cruise control speed without a downshifting engagement; and an additional motor propelling torque component which is transferred in conjunction with the engine propelling torque to maintain the cruise control speed when a downshifting engagement of the engine alone would have to occur for the engine to provide additional engine propelling torque.

In an embodiment, a system is provided. The system includes a controller configured to transfer motor torque to a transmission from a motor in series with an engine to maintain cruise control speed of a vehicle as road load varies, such as when the vehicle travels over a hill.

In an embodiment, a hybrid electric vehicle is provided. The vehicle includes a motor connected to a transmission, an engine connected to the transmission via the motor, and a controller. The controller is configured to transfer motor torque from the motor to the transmission to maintain cruise control speed of the vehicle as the vehicle travels over a hill.

Various embodiments include associated advantages. For example, using negative motor torque in combination with engine braking torque may reduce transmission shifts when operating in cruise control and road load decreases, such as when traveling downhill. Reducing or minimizing transmission shifting in cruise control according to various embodiments of the present disclosure may improve vehicle efficiency and drivability. Additional objects, features, and advantages of embodiments of the present invention will become more readily apparent from the following detailed description when taken in conjunction with the drawings, wherein like reference numerals refer to corresponding parts.

BRIEF DESCRIPTION OF THE DRAWINGS

FIG. 1 illustrates a block diagram of an exemplary hybrid vehicle powertrain in accordance with an embodiment of the present invention;

DETAILED DESCRIPTION

Figure 2A:
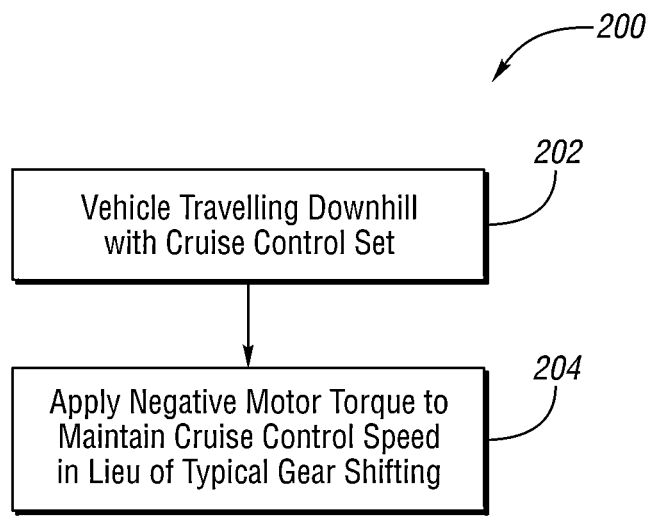
FIG. 2A illustrates a flowchart describing operation of a control strategy for adjusting motor torque of the motor to compensate for downhill demands during cruise control in a hybrid electric vehicle in accordance with an embodiment of the present invention.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a block diagram of an exemplary powertrain system 10 for a hybrid electric vehicle in accordance with an embodiment of the present invention is shown. Powertrain system 10 includes an engine 20, an electric machine such as an electric motor/generator 30 ("motor"), a traction battery 36, and a multiple step-ratio automatic transmission 50.

Engine 20 and motor 30 are drive sources for the vehicle. Engine 20 is connectable in series to motor 30 through a disconnect clutch 32. Motor 30 is connected to the input side of transmission 50. For example, motor 30 may be connected to transmission 50 via a torque converter between motor 30 and the input side of transmission 50. The input side of transmission 50 is connected in series with both engine 20 and motor 30 when engine 20 is connected to motor 30 via disconnect clutch 32. In this case, transmission 50 is connected to motor 30 while at the same time being connected to engine 20 via motor 30. On the output side, transmission 50 is connected to the drive wheels 60 of the vehicle. The driving force applied from engine 20 and/or motor 30 is transmitted through transmission 50 to drive wheels 60 thereby propelling the vehicle.

Engine 20 has an engine shaft 22 connectable to an input shaft 24 of motor 30 through disconnect clutch 32. Although disconnect clutch 32 is described and illustrated as a hydraulic clutch, other types of clutches may be used. Motor 30 has an output shaft 42 connected to the input side of transmission 50.

Transmission 50 includes multiple discrete gear ratios automatically selectable by a vehicle controller in response to vehicle operating conditions and a driving mode selected by the operator. The output side of transmission 50 includes an output shaft 54 that is connected to a differential 56. Drive wheels 60 are connected to differential 56 through respective axles 66. With this arrangement, transmission 50 transmits a powertrain output torque 68 to drive wheels 60.

Engine 20 is a one source of power for powertrain system 10. Engine 20 is an internal combustion engine such as a gasoline, diesel, or natural gas powered engine, for example. Engine 20 generates an engine power having an engine torque 76 that is supplied to transmission 50 when engine 20 and motor 30 are connected via disconnect clutch 32. The engine power corresponds to the product of engine torque 76 and the engine speed of engine 20. To drive the vehicle with engine 20, at least a portion of engine torque 76 passes from engine 20 through disconnect clutch 32 to motor 30 and then from motor 30 to transmission 50.

Traction battery 36 is another source of power for powertrain system 10. Motor 30 is linked to battery 36 through wiring 53. Depending on the particular operating mode of the vehicle, motor 30 either converts electric energy stored in battery 36 into a motor power having a motor torque 78 or sends a corresponding amount of electrical power to battery 36 when operating as a generator. The motor power corresponds to the product of motor torque 78 and the motor speed of motor 30. To drive the vehicle with motor 20, motor torque 78 is transmitted from motor 30 to transmission 50. When generating electrical power for storage in battery 36, motor 30 obtains power either from engine 20 in a driving mode or from the inertia in the vehicle as motor 30 acts as a brake when operating in a regenerative braking mode.

As described, engine 20, disconnect clutch 32, motor 30, and transmission 50 are connectable sequentially in series as illustrated in FIG. 1. As such, powertrain system 10 represents a modular hybrid transmission ("MHT") configuration in which engine 20 is connected to motor 30 by disconnect clutch 32 with motor 30 being connected to transmission 50.

The state or mode of disconnect clutch 32 being engaged or disengaged determines which input torques 76 and 78 are transferred to transmission 50. For example, if disconnect clutch 32 is disengaged, then only motor torque 78 is supplied to transmission 50. If disconnect clutch 32 is engaged/locked, then both engine torque 76 and motor torque 78 are supplied to transmission 50. Of course, if only engine torque 76 is desired for transmission 50, disconnect clutch 32 is engaged/locked, but motor 30 is not energized such that engine torque 76 is only supplied to transmission 50. Depending on the particular application and implementation, disconnect clutch 32 may be operated in a limited slip mode.

Transmission 50 includes clutches, bands, gears, and the like, and may include one or more planetary gear sets to selectively effect different discrete gear ratios by selective engagement of friction elements to establish the torque flow paths and provide the corresponding desired multiple step-ratios. The friction elements are controllable through a shift schedule within controller 80 or a dedicated transmission controller that connects and disconnects certain elements of the planetary gear sets to control the ratio between the transmission input and the transmission output. Transmission 50 is automatically shifted from one ratio to another based on the needs of the vehicle. Transmission 50 then provides powertrain output torque 68 to output shaft 54 which ultimately drives drive wheels 60. The kinetic details of transmission 50 can be established by a wide range of transmission arrangements. Transmission 50 is an example of a transmission arrangement for use with embodiments of the present invention. Any multiple ratio transmission that accepts input torque (s) from an engine and/or a motor and then provides torque to an output shaft at the different ratios is acceptable for use with embodiments of the present invention.

Powertrain system 10 further includes a vehicle system controller 80. Powertrain system 10 further includes an accelerator pedal 92 and a brake pedal 94. Accelerator pedal 92 and brake pedal 94 are in communication with controller 80.

The driver of the vehicle depresses accelerator pedal 92 to propel the vehicle. In response, a total drive command based on the positioning of accelerator pedal 92 is provided to controller 80. Controller 80 apportions the total drive command between the engine power and the motor power to be provided to transmission 50 for propelling the vehicle. In particular, controller 80 apportions the total drive command between (i) an engine torque signal 100 (which represents the amount of engine torque 76 to be provided from engine 20, operating at a corresponding engine speed, to transmission 50 for propelling the vehicle) and (ii) a motor torque signal 98 (which represents the amount of motor torque 78 to be provided from motor 30, operating at a corresponding motor speed, to transmission 50 for propelling the vehicle). In turn, engine 20 generates the engine power having engine torque 76 and motor 30 generates the motor power having motor torque 78 for propelling the vehicle. Both engine torque 76 and motor torque 78 are supplied to transmission 50 (assuming that engine 20 is connected to motor 30 via disconnect clutch 32) such that the vehicle is propelled. Such engine torque 76 and motor torque 78 for propelling the vehicle are referred to herein as "positive" torques. Those of ordinary skill in the art will recognize that the positive/negative naming convention is used for ease of description only.

The driver of the vehicle depresses brake pedal 94 to slow or brake the vehicle. In response, a total brake command based on the positioning of brake pedal 94 is provided to controller 80. Controller 80 apportions the total brake command between (i) powertrain braking power to be provided by engine 20 and/or motor 30 to transmission 50 for braking the vehicle and (ii) friction braking power to be applied by friction brakes 70 to drive wheels 60 for braking the vehicle. The powertrain braking power represents the amount of "negative" powertrain power to be provided by engine 20 and/or motor 30 to transmission 50 for braking the vehicle. Controller 80 apportions the powertrain braking power between (i) an engine torque signal 100 (which in this case represents the amount of negative engine torque 76 to be provided from engine 20, operating at a corresponding engine speed, to transmission 50 for braking the vehicle) and (ii) a motor torque signal 98 (which in this case represents the amount of negative motor torque 78 to be provided from motor 30, operating at a corresponding motor speed, to transmission 50 for braking the vehicle). In turn, engine 20 generates the engine power having negative engine torque 76 and motor 30 generates the motor power having negative motor torque 78 for braking the vehicle. Both engine torque 76 and motor torque 78 are supplied to transmission 50 (assuming that engine 20 is connected to motor 30 via disconnect clutch 32) to brake the vehicle. Controller 80 further generates a friction braking torque signal 96 (which represents the amount of torque to be obtained through friction brakes 70). In turn, friction brakes 70 apply the friction braking torque to drive wheels 60 to brake the vehicle.

Figure 2B:
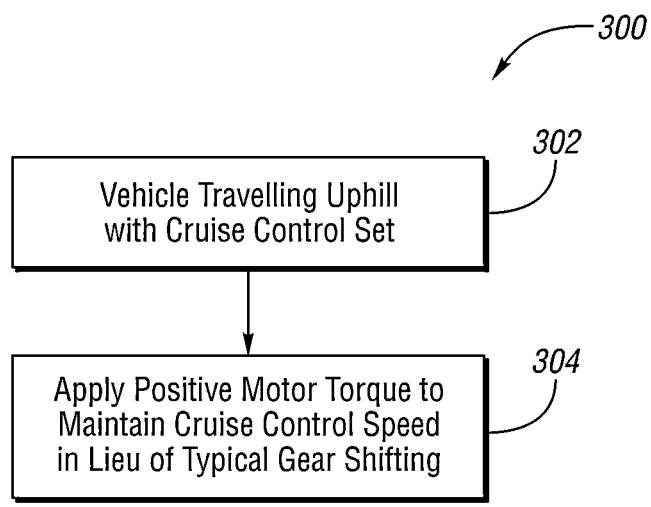
FIG. 2B illustrates a flowchart describing operation of a control strategy for adjusting motor torque of the motor to compensate for uphill demands during cruise control in a hybrid electric vehicle in accordance with an embodiment of the present invention.

Referring now to FIGS. 2A and 2B, with continual reference to FIG. 1, operation of control strategies for adjusting motor torque 78 of motor 30 to compensate for variations in road load, such as associated with downhill and uphill travel demands, for example, during cruise control in a vehicle having the MHT vehicle configuration in accordance with embodiments of the present invention will be described. FIG. 2A illustrates a flowchart 200 describing operation of a control strategy for adjusting motor torque 78 to compensate for downhill demands during cruise control of the vehicle. FIG. 2B illustrates a flowchart 300 describing operation of a control strategy for adjusting motor torque 78 to compensate for uphill demands during cruise control in the vehicle.

Briefly, cruise control allows the driver of the vehicle to set a desired speed and maintain the speed of the vehicle within a specified range of the set speed. Controller 80 then controls the powertrain (e.g., engine 20, motor 30, transmission 50, etc.) to keep the vehicle at or near the set speed without any further driver input. However, it is also desirable to reduce or minimize changes in engine speed and transmission shifting or ratio hunting to provide desired driveability and vehicle fuel/energy efficiency. When the vehicle is travelling downhill while in cruise control, some downhill grades are too steep for engine 20 to have enough engine braking capability to hold the set speed without shifting to a lower gear. When this happens, engine noise increases and the cruise control experience is a less comfortable one. Likewise, when the vehicle is travelling uphill while in cruise control, occasionally a downshift is required. When a downshift occurs, engine RPM increases (i.e., tachometer shifts) can become relatively large and disturb the driver or passengers in the vehicle.

As explained below, control strategies in accordance with embodiments of the present invention take advantage of the MHT vehicle configuration described herein, in which engine 20 is connected to motor 30 and motor 30 is connected to transmission 50, by adjusting motor torque 78 from motor 30 to smooth out the demands of travelling downhill and uphill while in cruise control.

Turning now to FIG. 2A, flowchart 200 describes control strategy operation for the case of travelling downhill with disconnect clutch 32 locked and the cruise control set as indicated in block 202. In this case, negative motor torque 78 from motor 30 is provided to transmission 50 as needed to brake the vehicle to maintain the cruise control speed as indicated in block 204. The control strategy for the downhill scenario takes advantage of the MHT vehicle configuration in which motor 30 is in series with engine 20. Motor 30 being in series with engine 20 allows the powertrain braking torque (i.e., the combined braking torque from engine 20 and motor 30) to be significantly greater than the braking torque available from engine 20 alone. This is because braking torque from engine 20 is inherently much more limited than braking torque from motor 30 such that motor 30 makes a bigger difference to the powertrain braking torque. In this mode, downshifts may be avoided and cruise control operation is enhanced. Negative motor torque may be provided by operating the motor as a generator to charge battery 36 in a regenerative braking mode. In one embodiment, negative motor torque may also be provided by reversing the driving current polarity to the motor 30 using stored energy from battery 36 to provide additional negative braking torque.

The downhill control strategy operation may come into play with engine 20 providing engine braking torque 76 to transmission 50 to attempt to maintain the cruise control speed. Once controller 80 becomes aware that engine 20 does not have enough engine braking capability to hold the cruise control speed without shifting to a lower gear, motor 30 applies a sufficient amount of motor braking torque 78 to transmission 50 in order to maintain the cruise control speed.

Turning now to FIG. 2B, flowchart 300 describes control strategy operation for the case of travelling uphill with the cruise control set as indicated in block 302. In this case, positive motor torque 78 from motor 30 is provided to transmission 50 as needed to propel the vehicle to maintain the cruise control speed as indicated in block 304. The control strategy here also takes advantage of the MHT vehicle configuration in which motor 30 is in series with engine 20. Motor 30 being in series with engine 20 allows torque to be drawn from motor 30 when needed to meet the demands of travelling uphill. As such, when travelling uphill with the cruise control set, instead of changing transmission gears, motor 30 is activated and the current gear position is maintained if possible. If the gear position is not able to be maintained, then gear shifting is at least kept to a minimum.

The uphill control strategy operation may come into play with engine 20 providing engine torque 78 to transmission 50 for propelling the vehicle. Motor 30 may or may not be providing motor torque 78 to transmission 50 for propelling the vehicle. In either case, once controller 80 becomes aware that engine 20 is not providing sufficient engine torque 76 to hold the cruise control speed without a downshift being engaged, motor 30 applies a sufficient amount of motor torque 78 to transmission 50 in order to maintain the cruise control speed.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for a vehicle having an engine, a traction motor, and a transmission coupled in-series, comprising:
   controlling engine torque to attempt to maintain a cruise control speed of the vehicle as the vehicle travels uphill; and
   controlling motor torque to maintain the cruise control speed without downshifting the transmission, the motor torque including an initial torque associated with no transmission downshift and an additional torque associated with a commanded transmission downshift.

2. The method of claim 1 further comprising:
   controlling motor torque to provide braking torque through the transmission to substantially maintain the cruise control speed as the vehicle travels downhill.

3. The method of claim 2 further comprising:
   inhibiting transmission shifting based on a sum of engine braking torque and motor torque.

4. The method of claim 2 wherein:
   the motor torque is a negative motor torque to maintain the cruise control speed of the vehicle as the vehicle travels downhill.

5. The method of claim 1 further comprising:
   controlling engine braking torque to supplement the motor braking torque to attempt to maintain the cruise control speed as the vehicle travels downhill.

6. The method of claim 5 wherein controlling comprises:
   controlling the motor to provide an initial motor braking torque when the sum of motor braking torque and engine braking torque is sufficient to maintain the cruise control speed without downshifting the transmission; and
   controlling the motor to provide an additional motor braking torque in conjunction with the engine braking torque to maintain the cruise control speed when a transmission downshift is commanded.

7. A system for controlling a hybrid vehicle having an engine selectively coupled in series with a traction motor and automatic step-ratio transmission by a clutch, comprising:
   a controller configured to control engine torque to attempt to maintain a cruise control speed of the vehicle as the vehicle travels uphill and to increase positive motor torque to the transmission to maintain the cruise control speed of the vehicle without downshifting the transmission as the vehicle travels uphill, the motor torque including an initial torque associated with no transmission downshift and an additional torque associated with a commanded transmission downshift.

8. The system of claim 7 wherein:
   the controller is further configured to control negative motor torque to the transmission to maintain the cruise control speed as the vehicle travels downhill.

9. The system of claim 8 wherein:
   the controller operates the motor in a generator mode to store power in an associated battery and produce the negative motor torque to maintain the cruise control speed as the vehicle travels downhill.

10. The system of claim 8 wherein:
    the controller is further configured to apply engine braking torque to maintain the cruise control speed as the vehicle travels downhill.

11. The system of claim 10 wherein the controller is configured to downshift the transmission when available engine braking torque and motor braking torque are insufficient to maintain the cruise control speed as the vehicle travels downhill.

12. A hybrid electric vehicle comprising:
    a battery power traction motor connected to a transmission;
    an engine selectively coupled in series with the motor by a clutch; and
    a controller communicating with the traction motor and the engine and configured to control the motor to provide positive motor torque to the transmission when the clutch is engaged and engine torque is insufficient to maintain cruise control speed of the vehicle without downshifting the transmission as the vehicle travels uphill, the motor torque including an initial torque associated with no transmission downshift and an additional torque associated with a commanded transmission downshift.

13. The vehicle of claim 12 wherein the controller inhibits shifting of the transmission until available motor torque is insufficient to maintain the cruise control speed.

14. The vehicle of claim 12 wherein the controller is configured to sequentially apply engine braking torque and increasing motor braking torque before commanding a transmission downshift to maintain the cruise control speed as the vehicle travels downhill.

15. The vehicle of claim 14 wherein the controller is configured to operate the motor as a generator to store power in the battery to provide motor braking torque.

16. The vehicle of claim 14 wherein the controller is configured to downshift the transmission when the motor braking torque and engine braking torque is insufficient to maintain the cruise control speed.

17. The vehicle of claim 14 wherein the controller is configured to increase motor braking torque to a maximum available braking torque before downshifting the transmission.

* * * * *